United States Patent
Bai

(10) Patent No.: US 7,798,941 B2
(45) Date of Patent: Sep. 21, 2010

(54) COMPLIANCE-ON-DEMAND FOR VEHICLE TRANSMISSION CLUTCH

(75) Inventor: Shushan Bai, Ann Arbor, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 186 days.

(21) Appl. No.: 11/171,040

(22) Filed: Jun. 30, 2005

(65) Prior Publication Data

US 2007/0004548 A1    Jan. 4, 2007

(51) Int. Cl.
*B60W 10/02* (2006.01)
*B60W 10/04* (2006.01)

(52) U.S. Cl. .................... 477/180; 477/174
(58) Field of Classification Search .......... 477/174, 477/180
See application file for complete search history.

(56) References Cited

U.S. PATENT DOCUMENTS

| 5,601,506 A | 2/1997 | Long et al. | |
| 5,810,694 A * | 9/1998 | Kamada et al. | ............. 477/150 |
| 5,908,098 A * | 6/1999 | Gorman et al. | ............ 192/109 F |
| 5,916,060 A * | 6/1999 | Jang | ............................ 477/155 |
| 6,234,290 B1 * | 5/2001 | Drexl et al. | ............. 192/85 CA |

FOREIGN PATENT DOCUMENTS

| JP | 11153214 A | * | 6/1999 |
| JP | 2003014099 A | * | 1/2003 |
| SU | 1057338 A | * | 11/1983 |

OTHER PUBLICATIONS

Machine translations of above JP documents.*
Translation of JP2003014099 and JP11153214.*

* cited by examiner

*Primary Examiner*—Tisha D Lewis
(74) *Attorney, Agent, or Firm*—Quinn Law Group, PLLC

(57) ABSTRACT

Provided is a selectively actuable compliance system for a vehicle transmission having a clutch in hydraulic communication with a clutch feed path. The compliance system also includes a disconnect valve or control that may selectively disconnect an accumulator or compliance element from the clutch feed path. While utilizing the compliance element during power-on up-shift may be desirable, the compliance element is not desirable for power-on down shifts. Therefore, this system provides a means of efficiently managing the use of a compliance element (or accumulator with damper) in the clutch assembly of a vehicle transmission.

16 Claims, 1 Drawing Sheet

COMPLIANCE-ON-DEMAND FOR VEHICLE TRANSMISSION CLUTCH

TECHNICAL FIELD

The present invention relates to a vehicle transmission with an hydraulically actuable clutch assembly configured to selectively disconnect a compliance element or accumulator.

BACKGROUND OF THE INVENTION

In general, a manual or automatic vehicle transmission includes a number of torque transmitting devices (referred to herein as clutch assemblies). Hydraulically controlled clutch assemblies can be configured with compliance enhancing devices such as a hydraulic accumulator with a damper. Dampers are typically configured to absorb excessive pressure pulses upon abrupt rises in the apply pressure which governs the piston of the clutch assembly. The damper may include a mechanical spring or other energy absorbing device. Dampening is most desirable to improve shift feel as the transmission shifts from one gear to the next.

The process of shifting from one gear to another gear occurs in three distinguishable phases: a) fill phase; b) torque phase and c) inertia phase. During the torque phase in power-on up-shifts, the torque is transmitted from the off-going clutch to the on-coming clutch until the torque is substantially transferred from one clutch to the next. Thereafter, the gearing shifting process enters into the inertia phase, where the slip speed of the on-coming clutch progresses to zero. The torque phase is preceded by a fill phase of which oil is supplied to the on-coming clutch. It is desirable to have a smooth transition during torque phase because gradually applying the piston will produce a smooth transference of torque. Conversely, abruptly applying the piston will produce an irregular transference of torque that may be detected by the vehicle operator. Therefore, an active compliance element in the on-coming clutch hydraulic control system is highly desirable during power-on up-shifts. However, during power-on down-shifts the off-going clutch is released in a precisely controlled manner and the on-coming clutch is sought to be rapidly disengaged and the inclusion of the compliance element slows the pressure response speed.

SUMMARY OF THE INVENTION

Since a compliance element may increase the responses time and decrease the preciseness of clutch release it is desirable to selectively remove the compliance element in the clutch control system during power-on down-shift. Accordingly, the present invention is directed to efficiently managing the use of a compliance element (or accumulator with a damper) in the clutch assembly of a vehicle transmission. The accumulator is selectively connected to the clutch feed path of the transmission during power-on up-shifts and disconnected from the clutch feed path during power-on down-shifts.

In the illustrated embodiment of the present invention, the clutch assembly includes a pressure control valve that supplies pressure to the clutch piston. An accumulator with a damper is selectively hydraulically communicable with the clutch feed path to selectively absorb pressure in excess of a predetermined range.

Also in the illustrated embodiment of the present invention, a disconnect valve is in hydraulic communication with the clutch feed path of the transmission. The disconnect valve selectively disconnects the accumulator from the clutch feed path.

The disconnect valve may further include a hydraulically actuable disconnect spool configured to selectively connect or disconnect the accumulator from the clutch feed path.

The disconnect valve may further define a spool cavity, housing the spool, configurable to define an exhaust to release hydraulic fluid from the spool cavity when the disconnect spool is actuated.

More specifically, the present invention relates to a vehicle transmission having a hydraulic clutch feed path with a hydraulically actuable clutch piston in communication with the clutch feed path. Additionally, a pressure control valve is configured to supply pressure to the clutch piston through the clutch feed path. The transmission further includes an accumulator selectively hydraulically communicable with the clutch feed path. The accumulator has a damper configurable to selectively absorb pressure in excess of a predetermined range.

The present invention also relates to a method for governing compliance in a vehicle transmission clutch. The method includes pressurizing a hydraulic circuit and a damper, hydraulically communicable with the transmission clutch; hydraulically connecting the damper with the hydraulic circuit in a manner to increase clutch compliance for better control of transmission torque during power-on up-shifts; and hydraulically disconnecting the damper from the hydraulic circuit in a manner to decrease clutch compliance during power-on down-shifts.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

The present invention may be implemented, by way of example, with an electro-hydraulic control of the type described in U.S. Pat. No. 5,601,506 to Long et al. which is commonly owned with the present application and hereby incorporated by reference in its entirety. Accordingly, the control elements shown in FIG. 1 hereof have been greatly simplified, it being understood that further information regarding the fluid pressure routings and so on may be found in the aforementioned patent.

Figure 1:
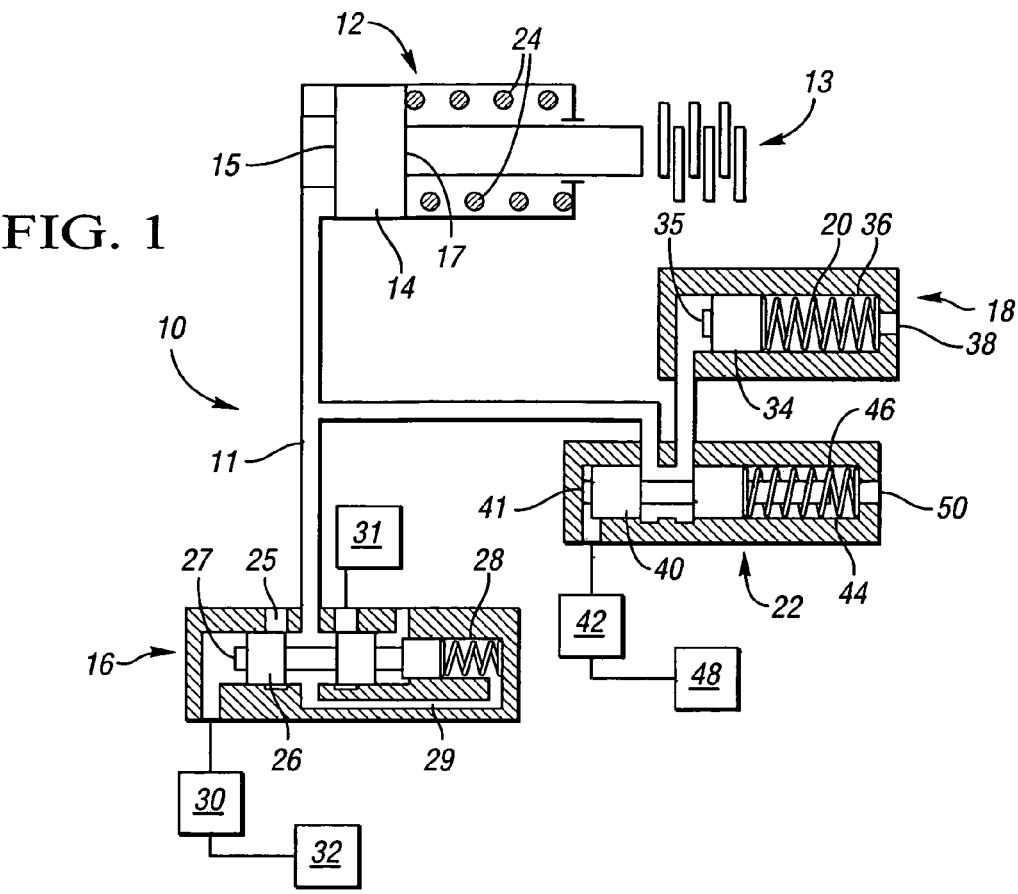
FIG. 1 is a schematic cross-sectional view of the clutch feed path in hydraulic communication with a clutch assembly, accumulator, disconnect valve and clutch pressure control valve.
Figure 2:
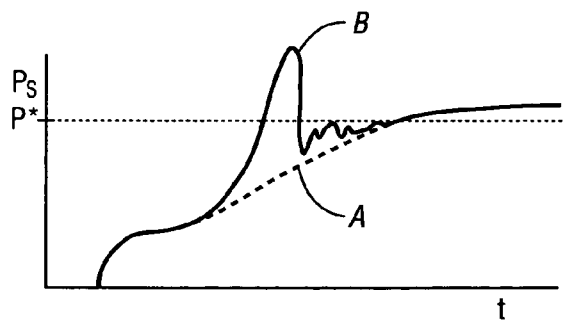
FIG. 2 is a graphical depiction comparing the pressure in the clutch feed path, both with and without the accumulator, as a function of time.
Figure 3:
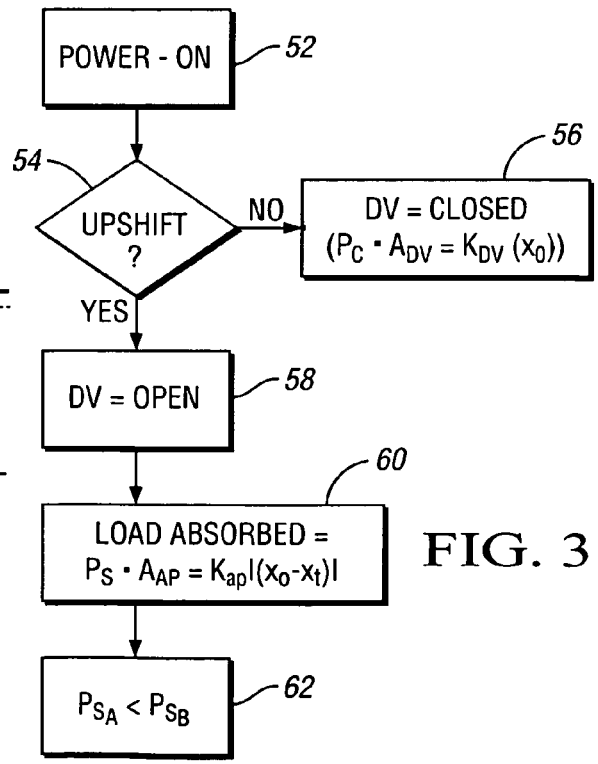
FIG. 3 is a flow diagram illustrating the functionality of the disconnect valve according to the supply pressure provided by the clutch pressure control valve.

Referring to the drawings, FIGS. 1 through 3, wherein like characters represent the same or corresponding parts throughout the several views there is shown in FIG. 1 a cross-sectional view of a clutch feed path 10 (defined at least partially by tube 11) for a vehicle clutch assembly 12. Fundamentally, the present invention relates to a hydraulic clutch feed path 10 for a vehicle transmission. The clutch feed path 10 includes a hydraulically actuable clutch piston 14, a pressure control valve 16 configured to supply pressure to the clutch piston 14 through the clutch feed path 10, and an accumulator 18 selectively hydraulically communicable with the clutch feed path 10. The accumulator 18 has a damper 20 configurable to selectively absorb pressure in excess of a predetermined range.

More specifically, with reference to FIG. 1, the present invention relates to a clutch control system with clutch feed path 10 in hydraulic communication with a clutch assembly 12, accumulator 18, disconnect valve 22 (or control) and pressure control valve 16. The clutch assembly 12 is configured with a hydraulically actuable piston 14, which upon lateral movement engages a set of complimentary clutch plates (not shown). When the pressure on the fore side 15 of the piston 14 is greater than the pressure on the aft side 17, i.e., the piston 14 reaches its stroking pressure and the piston 14 moves laterally to engage the complimentary clutch plates. The piston 14 is hydraulically linked to a pressure control valve 16 through the tube 11 of the clutch feed path 10. The pressure control valve 16 serves as a regulator of pressure to the clutch feed path 10. The pressure control valve 16 consists of a dual-headed spool 26, spring biased with respect to the control valve spool cavity 28. The fore side 27 of the control valve spool 26 is hydraulically linked to a supply line (or pump) 30. Under predetermined conditions, supply line 30 applies a signal pressure to overcome the spring bias against the control valve spool 26 to selectively connect or disconnect the pressure control valve 16 from the clutch feed path 10. When the clutch pressure valve 16 is to be disconnected from the clutch feed path 10 the signal pressure is reduced and the control valve piston 26 seals the connection between the pressure control valve 16 and the tube 11 of the clutch feed path 10. The supply line (or pump) 30 governing the connection between the pressure control valve 16 and the clutch feed path 10 may be controlled by a control unit 32 configured to send a signal to the pump 30 under certain predetermined conditions. Generally, when it is desirable for clutch assembly 12 to be engaged the control unit 32 may instruct the supply line 30 to provide a signal pressure to the fore side 27 of the control valve spool 26 so as to enable the pressure control valve 16 to supply enough pressure to the fore side 15 of the clutch piston 14, through the clutch feed path 10, thereby engaging the complimentary clutch plates 13. In the illustrated embodiment, the pressure control valve 16 is configured to gradually supply pressure to tube 11, in proportion to the signal pressure provided by pump 30. The pressure control valve 16 has an additional pressure supply in pump 31 which provides a constant pressure to the control valve spool cavity 28. Pump 31 provides a constant resistive pressure to the control valve spool 26. Moreover, the control valve is configured with an output pressure feed path 29 which allows hydraulic medium supplied by pump 31 into spool cavity 28 to gradually flow into tube 11. This arrangement enables the pressure control valve 16 to regulate the output pressure in a manner proportional to the signal pressure supplied by pump 30. The control pressure valve 16 further defines an exhaust 25 to release pressure from the fore side 27 of the control valve spool 26. The output pressure may range from 0 to 100 psi in the illustrated embodiment.

With further reference to FIG. 1, a compliance element or accumulator 18 is included in the present invention. The accumulator 18 is a passive compliance device. The accumulator 18 consists of an accumulator piston 34 hydraulically linkable to the clutch feed path 10 of the transmission. The pressure on the fore side 35 of the accumulator piston 34 is substantially equal to the supply pressure, $P_s$, provided by the pressure control valve 16 when the accumulator 18 is connected to the pressure control valve 16. The accumulator piston 34 is spring biased within the accumulator cavity 36. Spring (or damper) 20 is configured with a predetermined stiffness so as to enable the accumulator piston 34 to move laterally, thereby absorbing the load resulting from the supply pressure only when the supply pressure is greater than a predetermined value. In one arrangement, the predetermined range is from 0 psi to 50 psi. Therefore, the load seen by the accumulator spring 20 is equal to the supply pressure, $P_s$, multiplied by the surface area of the fore side 35 of the accumulator piston 34. This load is equal to the spring constant, $K_{ap}$, of the accumulator spring 20 multiplied by the change in lateral movement of the accumulator piston 34. Accordingly, the greater the supply pressure, $P_s$, is the more the accumulator spring 20 will compress thereby absorbing more energy. The accumulator 18 further defines an exhaust 38 on the aft side of the accumulator piston cavity 36. The exhaust 38 serves to release hydraulic fluid from the accumulator piston cavity 36 upon stroke of the accumulator piston 34.

One technical advantage of the present invention is that the accumulator 18 may be selectively connected and disconnected from the clutch feed path 10 to provide compliance-on-demand (or compliance under predetermined conditions). The disconnect valve 22 is hydraulically linked to the accumulator 18 and the clutch feed path 10 and is configured there between. The disconnect valve 22 consist of a dual headed spool 40 similar to that of the clutch pressure control valve 16. The fore side 41 of the disconnect valve spool 40 is hydraulically linked to a pump or pressure supply line 42 which provides a control pressure, $P_c$, to the fore side 41 of the disconnect valve spool 40 to selectively disconnect the accumulator 18 from the clutch feed path 10. The disconnect valve spool 40 is spring biased against the disconnect valve piston cavity 44. When the control pressure, $P_c$, is greater than the force of the spring 46 the disconnect spool 40 moves laterally to close the hydraulic link between the accumulator 18 and the clutch feed path 10. The pump or supply line 42 may be governed by a control unit 48 operative to increase the control pressure when compliance (or the accumulator 18) is sought to be removed from the clutch feed path 10, thereby being removed from the clutch control system. Furthermore, spring 46 is configured with a stiffness, $K_{dv}$, such that the control pressure, $P_c$, multiplied by the surface area on the fore side 41 of the disconnect valve piston 40 equals the spring constant, $K_{dv}$, multiplied by the lateral movement required of the disconnect valve piston 40 to close the disconnect valve 22. Similarly to the accumulator 18, the disconnect valve 22 may be equipped with an exhaust 50 to release hydraulic medium from the disconnect valve piston cavity 44 upon stroke of the disconnect valve piston 40. Though in the illustrated embodiment the disconnect value is shown as a two stage valve, the disconnect valve may also be a regulator valve such as the control supply valve 16.

With reference to FIG. 2, the pressure inside the clutch feed path, $P_s$, is plotted as a function of time. Plot A is a schematic depiction of the pressure inside the clutch feed path 10 with the accumulator 18 connected thereto (or in compliance-on mode) and the disconnect valve 22 open during clutch fill phase and torque phase. Plot B, however, demonstrates the pressure inside the clutch feed path 10, $P_s$, with the disconnect valve 22 closed (or in compliance-off mode) and the accumulator 18 detached from the system. The pressure required to stroke the piston 14 of the clutch assembly 12 is P*. As shown in FIG. 2, the pressure gradually progresses to the desired level for piston actuation, P*, when the accumulator 18 is present (as shown in Plot A); however, without the accumulator 18 the pressure within the clutch feed path 10 aggressively climbs beyond the desired level and outside of the predetermined range (0 psi to P* psi). The vehicle operator may detect such an aggressive climb.

The logistics of the disconnect valve 22 are at least partially illustrated in FIG. 3 and discussed herein. It is only under the conditions of a power-on up-shift that the compliance element (or accumulator 18) is utilized in the illustrated embodiment. Where the engine is on 52 and the transmission is down shifting, the disconnect valve 22 (as shown in FIG. 1) is closed and the compliance element is removed from the clutch feed path as indicated at 56. Since the disconnect valve 22 is hydraulically actuable and spring biased, the control pressure, $P_c$, required to close the disconnect valve must be greater than to the spring force pressure of the disconnect valve, $K_{dv}$ multiplied by the distance required to seal the disconnect valve divided by the surface area of the fore side 41 of the disconnect valve piston 40. If the transmission is in up-shift mode 54 the disconnect valve is open, as shown at 58, and the accumulator (or compliance element) is enabled to absorb a load according to the stiffness of the biasing spring 20. The absorbed load will be equal to the spring constant $K_{ap}$ multiplied by the distance traveled by the accumulator piston as shown at 60. The result is that the pressure throughout the clutch feed path 10, $P_{s-A}$, with accumulator 18 will be less than the pressure without, $P_{s-B}$, as shown at 62.

The present invention also includes a method for governing compliance in a vehicle transmission clutch 12. The method includes pressurizing a hydraulic circuit (or clutch feed path 10 as shown in FIG. 1) and a damper (or accumulator 18), hydraulically communicable with the transmission clutch 12; hydraulically connecting the damper 12 with the hydraulic circuit 10 in a manner to increase clutch compliance for better control of transmission torque during power-on up-shifts; and hydraulically disconnecting the damper 18 from the hydraulic circuit 10 in a manner to decrease clutch compliance during power-on down-shifts.

While the best modes for carrying out the invention have been described in detail, those familiar with the art to which this invention relates will recognize various alternative designs and embodiments for practicing the invention within the scope of the appended claims.

The invention claimed is:

1. A vehicle transmission having a hydraulic control system with a hydraulic clutch feed path, comprising:
   a hydraulically actuable clutch piston in communication with the clutch feed path;
   a pressure control valve configured to supply pressure to said clutch piston through the clutch feed path;
   an accumulator selectively hydraulically communicable with the clutch feed path, said accumulator having a damper configurable to selectively absorb pressure in excess of a predetermined range;
   a disconnect valve in dual hydraulic communication with the clutch feed path and said accumulator, said disconnect valve including a hydraulically actuable disconnect spool configured in a manner to selectively hydraulically disconnect said accumulator from the clutch feed path and the hydraulic control system upon actuation of said disconnect spool; and
   a control unit configured in a manner to actuate said disconnect spool, said control unit disconnected from said clutch feed path and said pressure control valve.

2. The transmission of claim 1, wherein said control unit configured in a manner to actuate said disconnect spool is configured to govern the disconnection of said accumulator from the clutch feed path in response to a predetermined condition.

3. The transmission of claim 2, wherein said predetermined condition is a power-on down-shift of the vehicle transmission.

4. The transmission of claim 1, wherein said disconnect valve includes a spring to provide loading on said disconnect spool.

5. The transmission of claim 4, wherein said disconnect valve defines a spool cavity configured to house said disconnect spool, said disconnect valve defining an exhaust configured to release a hydraulic fluid from said spool cavity when said disconnect spool is actuated.

6. The transmission of claim 1, wherein said accumulator defines a piston cavity for said damper, which includes:
   a spring; and
   a hydraulically actuable accumulator piston mechanically linked to said spring when hydraulic pressure is supplied from the clutch feed path in excess of said predetermined range.

7. The transmission of claim 6, wherein said accumulator defines an exhaust configured to release a hydraulic fluid from said piston cavity when hydraulic pressure is applied to said cavity in excess of said predetermined range.

8. The transmission of claim 7, further comprising:
   a signal pressure operable to govern said pressure control valve.

9. A method of governing compliance in a vehicle transmission clutch, comprising:
   pressurizing a hydraulic circuit and a damper, hydraulically communicable with the transmission clutch;
   hydraulically connecting said damper with said hydraulic circuit in a manner to increase clutch compliance for better control of transmission torque, wherein said hydraulically connecting said damper with said hydraulic circuit is performed by a hydraulically actuable disconnect valve during power-on up-shift mode of operation of the vehicle transmission; and
   hydraulically disconnecting said damper from said hydraulic circuit via said hydraulically actuable disconnect valve in a manner to decrease clutch compliance.

10. The method of claim 9, wherein said hydraulically disconnecting said damper with said hydraulic circuit is performed during power-on down-shift mode of operation of the vehicle transmission.

11. A compliance-on-demand system for a transmission clutch assembly in communication with a hydraulic clutch feed path, comprising:
   a compliance element in hydraulic communication with the clutch feed path; and
   a control for said compliance element operable to selectively disconnect said compliance element with the clutch feed path, whereby to provide as a compliance-on-demand function either compliance substantially on or compliance substantially off;
   wherein said control includes a control pressure, said control pressure hydraulically disconnected from said hydraulic clutch feed path, and
   a disconnect valve in dual hydraulic communication with the clutch feed path and said compliance element, said disconnect valve including a disconnect spool actuable by said control pressure to disconnect said compliance element from the clutch feed path upon actuation of said disconnect spool and thereby eliminate hydraulic pressure to said compliance element.

12. The compliance-on-demand system of claim 11, wherein said disconnect spool is hydraulically actuable and configured in a manner to selectively hydraulically disconnect said compliance element from the clutch feed path upon actuation of said disconnect spool.

13. The compliance-on-demand system of claim 12, wherein said disconnect valve includes a spring to provide loading on said disconnect spool.

14. The compliance-on-demand system of claim 13, wherein said disconnect valve defines a spool cavity housing said disconnect spool, said disconnect valve defining an exhaust configured to release a hydraulic fluid from said spool cavity when said disconnect piston is actuated.

15. The compliance-on-demand system of claim 14, wherein said compliance element is an accumulator selectively hydraulically communicable with the clutch feed path, said accumulator having a damper configurable to selectively absorb pressure in excess of a predetermined range, said damper including:
 a spring; and
 a hydraulically actuable accumulator piston mechanically linked to said spring when hydraulic pressure is supplied from the clutch feed path in excess of said predetermined range.

16. The compliance-on-demand system of claim 15, wherein said accumulator defines an exhaust configured to release a hydraulic fluid from said spool cavity when hydraulic pressure is applied to said spool cavity in excess of said predetermined range.

* * * * *